US006943809B2

(12) United States Patent
Dermer

(10) Patent No.: US 6,943,809 B2
(45) Date of Patent: Sep. 13, 2005

(54) TILED VECTOR FLATTENED OUTPUT

(75) Inventor: Richard A. Dermer, Issaquah, WA (US)

(73) Assignee: Adobe Systems Incorporated, San Jose, CA (US)

( * ) Notice: Subject to any disclaimer, the term of this patent is extended or adjusted under 35 U.S.C. 154(b) by 561 days.

(21) Appl. No.: 09/880,464

(22) Filed: Jun. 12, 2001

(65) Prior Publication Data

US 2003/0011623 A1 Jan. 16, 2003

(51) Int. Cl.[7] ............................................... G06T 1/00
(52) U.S. Cl. ....................................... 345/621; 345/630
(58) Field of Search ................................. 345/620–622, 345/625, 628, 629, 630, 634, 635

(56) References Cited

U.S. PATENT DOCUMENTS 5,864,342 A * 1/1999 Kajiya et al. ............... 345/628
6,373,482 B1 * 4/2002 Migdel et al. .............. 345/419

FOREIGN PATENT DOCUMENTS

EP          1 104 918 A2     6/2001

OTHER PUBLICATIONS

Jim Blinn, "Dirty Pixels," Chapter Seven, Triage Tables, Morgan Kauffman Publishers, pp. 67–74, 1998.

* cited by examiner

Primary Examiner—Jeffery A. Brier
(74) Attorney, Agent, or Firm—Fish & Richardson P.C.

(57) ABSTRACT

Methods and apparatus, including computer program products, implementing and using techniques for processing a computer graphics illustration, the computer graphics illustration having overlapping objects. At least a region of the computer graphics illustration is broken up into tiles, without regard to the overlapping objects. The objects in each tile are processed to create vector output representing the tiled region of the computer graphics illustration. In one implementation, the boundaries of the tiles overlap. In an alternative implementation, the tiles are adjacent. In the latter implementation, information is obtained about physical pixel boundaries in an output device space, and each tile includes only pixels of the output device space that are wholly within the tile.

72 Claims, 3 Drawing Sheets

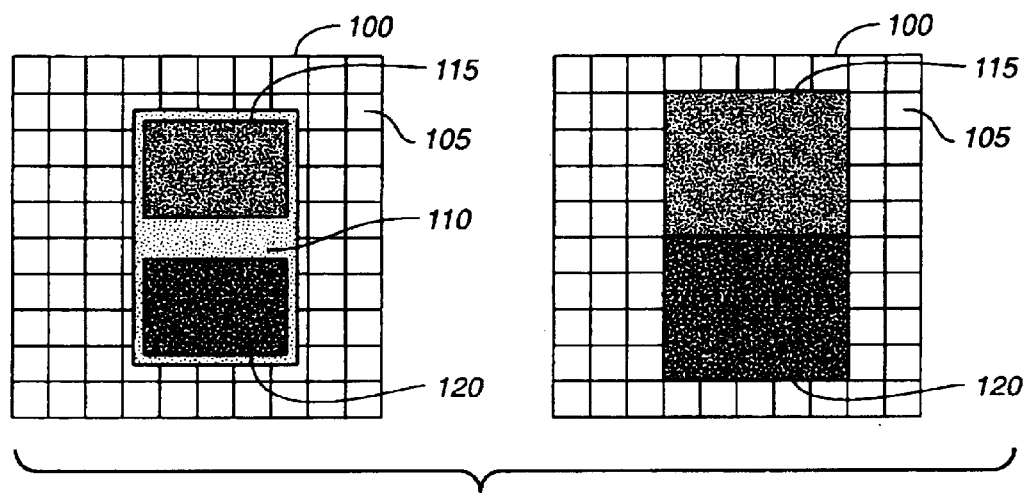
FIG._1
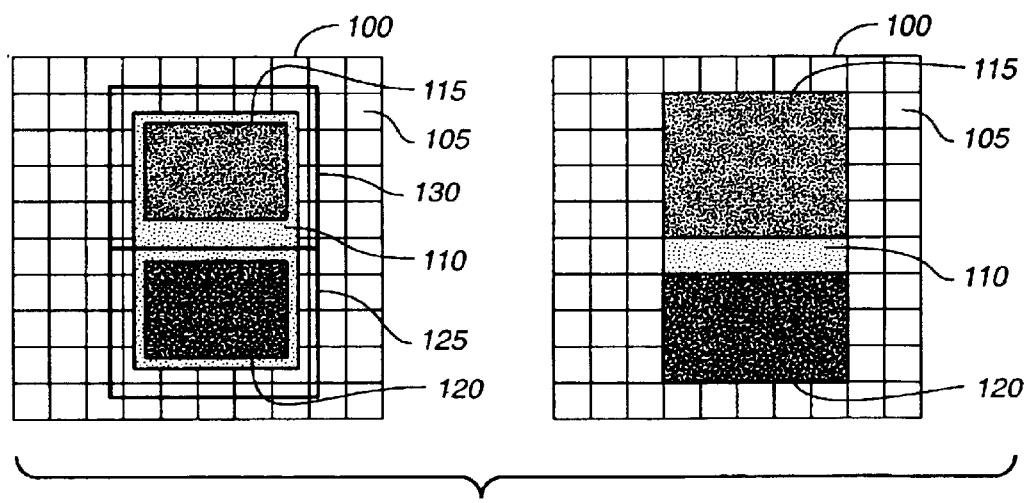
FIG._2

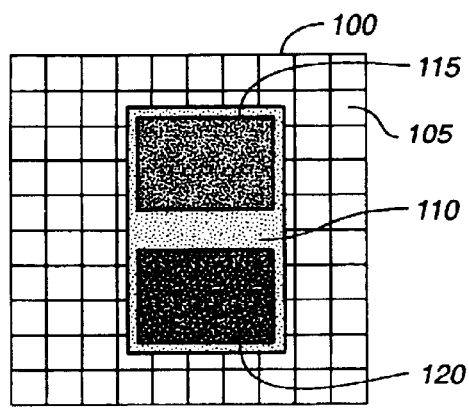
FIG._3A
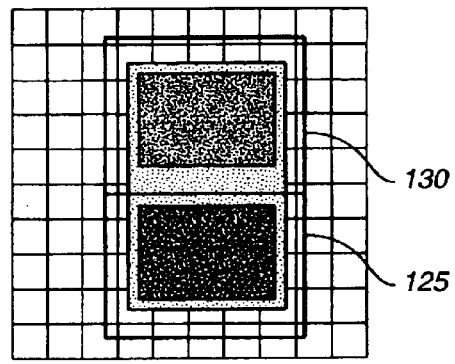
FIG._3B
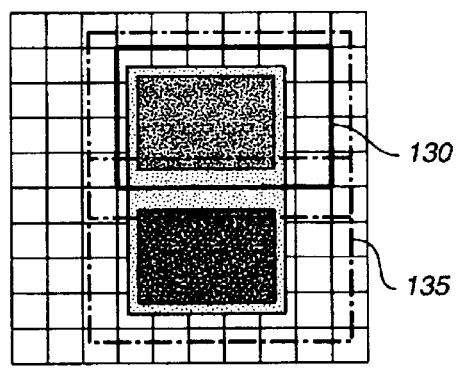
FIG._3C
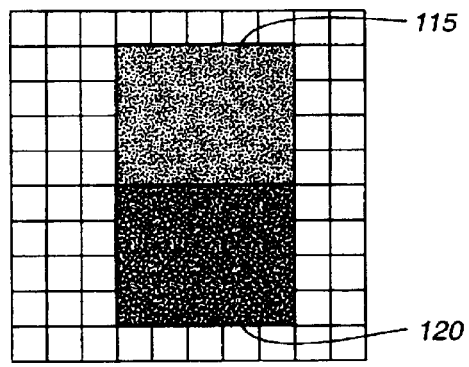
FIG._3D

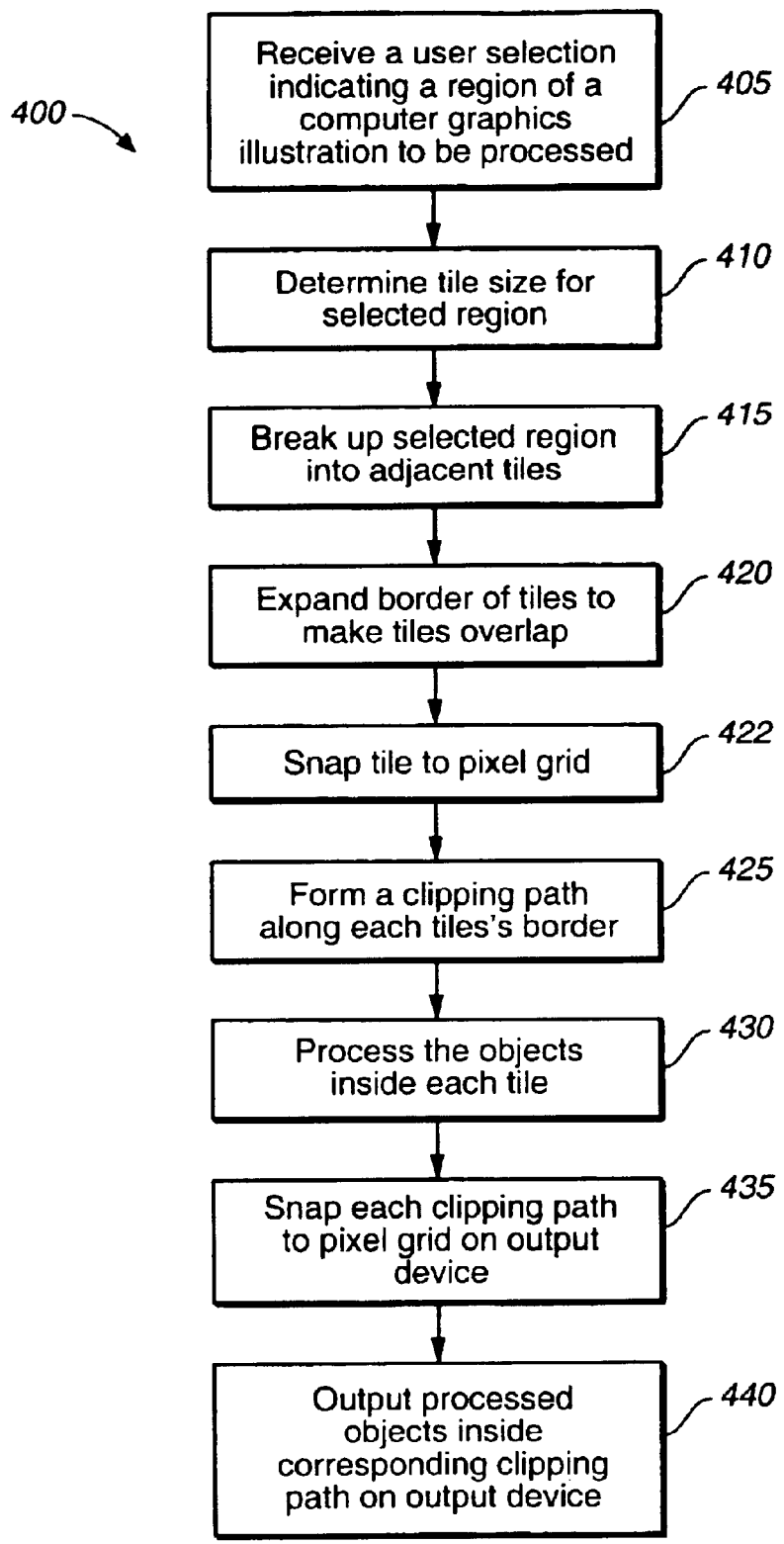
FIG._4

TILED VECTOR FLATTENED OUTPUT

BACKGROUND

The present invention relates to processing objects in a computer graphics illustration application.

A computer graphics illustration can be created using a computer graphics application program. The computer graphics illustration can include several objects which in turn can be arranged in one or more layers. Each object is delimited by a border and has its own color. Intersections between objects located in different layers in the computer graphics illustration define atomic regions.

The computer graphics illustration can be divided up into regions that are independent of the objects and the atomic regions. A region can include a part of an object, or several objects, depending on the size of the region. A region can further be tiled, that is, subdivided into portions (that is, tiles) that are independent of the objects or atomic regions within a given region of the computer graphics illustration. A tile has a closed boundary and can have any geometrical shape or size.

When printing an object in PostScript™ format from a graphics application such as Adobes® Illustrator, the PostScript™ printing process converts the received object data having a transparent imaging model and including several layers into a one-layer opaque model, using a technique known as planarization. The planarization technique includes steps for computing intersections between objects that are located in different layers in a computer graphics illustration to define atomic regions. Each atomic region includes a specific set of objects, each object having its own color. When all the atomic regions have been created, the atomic regions are processed one by one in order to create the final color of a given atomic region.

In a conventional planarization process, objects in an atomic region have a vector-based representation. However, when an atomic region becomes too complicated, that is, when the atomic region contains a large number of objects, the planarization process divides the atomic region into tiles, and rasterizes each tile. In a rasterized tile, the resulting color of the tile is determined on a pixel-by-pixel basis, resulting in a raster-based representation for all objects that intersect the respective tile.

Typically the planarization process does not flatten the raster-based representation forming a vector-based representation because stitching errors may occur. Normally, when a PostScript™ output is generated, each object has a vector-based representation and is painted in a particular order, the paint order. Stitching errors occur when the paint order is violated. Assume, for example, that there are two adjacent tiles. The first tile is processed and all the vector objects in the first tile are output. The second tile is processed and all the vector objects in the second tile are output. Since the tiles may share some pixels along the tile borders, some vector objects in the second tile may overwrite some vector objects in the first tile. This is a violation of the paint order.

The right hand side of FIG. 1 shows the output result when no tiles are present and conventional Postscript™ rules are applied to a source image, shown in the left hand side of FIG. 1. A pixel grid (100) includes multiple individual pixels (105). Three objects are drawn on the pixel grid (100). A light grey object (110) is drawn first, a dark grey object (115) is drawn second, and a black object (120) is drawn last. As can be seen, the borders of all the objects fall between the lines of the pixel grid (100), that is, each object fully covers some pixels and partially covers other pixels along its edges.

The right hand side of FIG. 1 shows the output after the PostScript™ overscan rules have been applied to the source objects in the left hand side of the FIG. 1. In summary, the Postscript™ overscan rules require that when several objects occupy the same pixel, the object that was drawn last will be drawn on top and occupy that entire pixel. As can be seen in the resulting output shown in the right hand side of FIG. 1, the light grey object (110) that was first drawn has been completely concealed by the dark grey object (115) and the black object (120). The resulting objects have also changed so that they completely occupy the pixels that previously were only partly occupied.

FIG. 2 shows how a stitching error may arise when tiles are applied to the objects and the objects are processed as vector based data. The left hand side of FIG. 2 shows the same objects as are shown in the left hand side of FIG. 1, but with the addition of two tiles having borders that act as clipping paths. The objects within each tile or clipping path are processed independently of surrounding tiles or objects. The objects in the left hand side in FIG. 2 are painted in the following order: clipping path (125), light grey object (110), black object (120), clipping path (130), light grey object (110), and dark grey object (115). When the PostScript™ output is generated, the objects inside the first clipping path (125) are processed first, and then the objects inside the second clipping path (130) are processed. When the light grey object inside the second clipping path (130) is processed, a row of pixels covering a part of the black object results, as shown on the right hand side in FIG. 2. This is an example of a violation of the paint order and results in a stitching error.

SUMMARY

In general, in one aspect, the invention provides methods and apparatus, including computer program products, implementing and using techniques for processing a computer graphics illustration, the computer graphics illustration having overlapping objects. Without regard to the overlapping objects, at least a region of the computer graphics illustration is broken up into tiles having overlapping boundaries. The objects in each tile are planarized to create flattened vector output representing the tiled region of the computer graphics illustration.

Advantageous implementations can include one or more of the following features. At least one of the overlapping objects can be transparent and the planarizing can include converting the objects in each tile to an opaque flattened vector output representing the tiled region of the computer graphics illustration. Breaking up at least a region of the computer graphics illustration into tiles having overlapping boundaries can include breaking up the computer graphics illustration into tiles having overlapping boundaries where tiles have the same shape or the same size. The tiles can be square shaped tiles with overlapping boundaries.

Breaking up at least a region of the computer graphics illustration into tiles having overlapping boundaries can include breaking up the at least one region of the computer graphics illustration into a grid of adjacent, non-overlapping tiles and expanding the boundaries of one or more tiles in the grid in a direction such that the boundaries of the tiles overlap. The boundaries of one or more tiles in the tile grid can be expanded by at least one pixel in the horizontal or vertical direction.

The size of the tiles can be selected based on an available amount of memory for planarizing the tiles. If the available amount of memory for planarizing the tiles will be exceeded, one or more of the overlapping tiles can be divided into smaller tiles with overlapping boundaries. A determination can be implemented to predict if the available amount of memory for planarizing the tiles will be exceeded. Alternatively, a memory overflow condition during the planarizing of the objects in each tile can be monitored. The dividing step can be repeated until the size of each tile is such that the available amount of memory for planarizing each tile will not be exceeded.

The size of the tiles can be selected based on the number of objects in a tile. If the number of objects in the tile exceeds a threshold value, one or more of the tiles with overlapping boundaries can be divided into smaller tiles with overlapping boundaries. The dividing step can be repeated until the size of each tile is such that the number of objects in each tile does not exceed the threshold value. Breaking up at least a region can include breaking up the computer graphics illustration. The border of each tile can be aligned to physical boundaries of pixels in a device space to make each tile include only pixels of the output device space that are wholly within the tile.

In general, in one aspect, the invention provides methods and apparatus, including computer program products, implementing and using techniques for processing a computer graphics illustration having overlapping objects. Without regard to the overlapping objects, tiles having boundaries that overlap by an amount corresponding to at least one pixel in a device space are provided. The tiles cover at least a region of the computer graphics illustration that includes overlapping objects. A clipping path corresponding to the boundary of each tile is supplied, and the objects surrounded by each clipping path are processed to produce vector output. An alignment tool is defined that can be passed as a part of a stream to an output device. The alignment tool can instruct the output device to align each clipping path to physical boundaries of pixels in the output device space to make each tile include only pixels of the output device space that are wholly within the tile.

Advantageous implementations can include one or more of the following features. The stream to the output device can be a Postscript™ stream. At least one of the overlapping objects can be transparent and processing can include converting the objects in each tile to an opaque flattened vector output representing the tiled region of the computer graphics illustration. The tiles can have the same shape or the same size. Providing tiles having overlapping boundaries can include providing a grid of adjacent, non-overlapping tiles and expanding the boundaries of one or more tiles in the grid in a horizontal or vertical direction such that the boundaries of the tiles overlap.

In general, in one aspect, the invention provides methods and apparatus, including computer program products, implementing and using techniques for processing a computer graphics illustration, the computer graphics illustration having overlapping objects wherein at least one object is transparent. A region of the computer graphics illustration to be processed is selected. The region includes at least a portion of the transparent object. Without regard to the overlapping objects, a grid of overlapping tiles covering the selected region are created. A clipping path corresponding to the boundary of each tile is supplied. An alignment tool is defined and can be passed as a part of a stream to an output device is defined. The alignment tool can instruct the output device to align each clipping path to physical boundaries of pixels in the output device space to make each tile include only pixels of the output device space that are wholly within the tile. The objects surrounded by each clipping path are processed to produce a vector output. The vector output and the alignment tool are passed in a stream to the output device. The alignment tool is used to align each tile to physical boundaries of pixels in the output device space to make each tile include only pixels of the output device space that are wholly within the tile. The processed objects are rendered as vector data on the output device.

Advantageous implementations can include one or more of the following features. Creating a grid of overlapping tiles can include creating a grid of overlapping tiles in which adjacent tiles overlap by at least one pixel. At least one of the overlapping objects can be transparent and the processing can include converting the objects in each tile to an opaque flattened vector output representing the tiled region of the computer graphics illustration.

In general, in one aspect, the invention provides methods and apparatus, including computer program products, implementing and using techniques for processing a computer graphics illustration, the computer graphics illustration having overlapping objects. Information is obtained about physical pixel boundaries in an output device space. Based on the pixel boundary information and, without regard to the overlapping objects, adjacent tiles covering at least a region of the computer graphics illustration that includes overlapping objects are provided. A clipping path corresponding to the boundary of each tile is supplied.

The objects surrounded by each clipping path are processed to produce a vector output and the vector output is passed as a stream to an output device.

The invention can be implemented to realize one or more of the following advantages. By planarizing smaller overlapping tiles to create a vector output, the planarizer can bound its memory usage. Memory in output devices, such as printers, can also be used more efficiently since an image is processed in "chunks" rather than all at once. Furthermore, downstream processes following the planarization process will not be troubled by font mismatches, rendering mismatches or color conversion mismatches. Processes such as trapping can operate on the actual vector data and stitching problems can be avoided. Since the processes propose preserving object type information, such as image, line art or text, post processes can make object type specific decisions in PostScript™. Examples of such processes include: color conversion processes where image-type objects are processed with a different color conversion than non-image objects; processes where black text below a certain point threshold may be set to automatically overprint; processes where black text above a certain threshold may be converted into a "rich black" (that is, black in combination with another ink) and screening processes where some Postscript™ output devices recognize object types and assign different screens depending on the object type.

The details of one or more embodiments of the invention are set forth in the accompanying drawings and the description below. Other features and advantages of the invention will become apparent from the description, the drawings, and the claims.

DESCRIPTION OF DRAWINGS

FIG. 1 shows a source image and a resulting output when PostScript™ is rendered from the source image in accordance with the prior art.

FIG. 2 shows a tiled source image and a resulting output having a stitching error as a result of PostScript™ being rendered from the tiled source image in accordance with the prior art.

FIGS. 3A–3D show a source image, intermediate steps, and a resulting output when PostScript™ is rendered from the source image in accordance with one aspect of the invention.

FIG. 4 shows a flowchart for processing a computer graphics illustration in accordance with one aspect of the invention.

Like reference symbols in the various drawings indicate like elements.

DETAILED DESCRIPTION

The invention will be described by way of example with reference to FIGS. 3A–3D and FIG. 4. As shown in FIG. 4, a process (400) for processing a computer graphics illustration starts with the process receiving a user selection of the region of the computer graphics illustration to be processed (405). One example of a region of the computer graphics illustration to be processed is shown in FIG. 3A. The region includes the objects that were discussed above in connection with FIG. 1 and FIG. 2, that is, the region of the computer graphics illustration includes a light grey object (110), a black object (120) disposed on top of the light grey object, and a dark grey object (115) also disposed on top of the light grey object, but not overlapping the black object.

The process then determines a tile size for the selected region of the computer graphics illustration (410). The tile size primarily depends on two factors: the available amount of memory for processing the contents of a tile and the complexity of each tile. For example, if a tile contains few objects or several objects with an opaque object at the top layer, then the tile size can be large since processing a tile with these characteristics will not require much memory. However, if a tile contains several objects, especially if one or more of the objects are transparent, more memory will be required. If the amount of memory needed exceeds the available amount, the tile size is decreased. Decreasing the tile size can be done either based on a prediction, or during processing of a tile if the memory should overflow. For example, a user, or the computer graphics application, can estimate an initial tile size. The estimation can, for example, be made by counting the number of objects or atomic regions within the region of the computer graphics illustration to be processed. The region is then subdivided into tiles having the initially determined tile size and the processing of the tiles is started. If a memory overflow condition occurs during the processing of the tiles, that is, if the initially chosen tile size is too big, each tile can be subdivided into two smaller tiles and the processing is restarted for each of the smaller tiles. If a memory overflow condition still occurs, each smaller tile is further subdivided, and the tile determination process continues in this manner until an appropriate tile size has been determined. Another way of decreasing the tile size is to use the recursive Warnock's algorithm (see "Dirty Pixels" by Jim Blinn, Morgan Kauffman Publishers, 1998, pp 68–71).

When an appropriate tile size has been determined, the process breaks up the selected region into overlapping tiles of the determined tile size. The object can be broken up into adjacent tiles (415), as shown in FIG. 3B (125, 130). The process then expands the borders of the tiles so that they overlap (420) and snaps the tiles to the pixel grid (422), as is shown by the dotted lines (135) in FIG. 3C. The size of the overlap can vary, but corresponds to at least one device pixel on the output device to which the graphics illustration will be sent after processing. For example, an ink-jet printer typically has a resolution of 300–600 dpi (dots per inch) and a laser printer typically has a resolution of 600–1200 dpi, so one device pixel would correspond to $\frac{1}{1200}$ to $\frac{1}{300}$ of an inch. Therefore, if the borders of the tiles are moved by $\frac{1}{100}$ inch, for example, to expand the tile, this will expand the tile by more than one device pixel for any of the output devices in this example.

The way the borders of a tile are moved when the tile is expanded to achieve an overlap is a matter of implementation. For example, if the tiles are square shaped, as shown in FIG. 3B and 3C, the border can be moved in one unit in a horizontal and one unit in a vertical direction for all the tiles. Alternatively, the border can be moved two units in a vertical and two units in a horizontal direction for every other tile. The tiles can be square shaped, triangular or hexagonal, and achieve the same results.

After the overlapping tiles have been created, a clipping path is formed (425) along each tile's border. The clipping path is used for rendering the processed contents of each tile on an output device, as will be described below.

The process continues by processing the objects inside each tile (430). In one implementation the processing of the objects includes a conventional planarization operation where the objects in the tile are combined into a single layer. Planarization is well known in the literature, and one example is described in the commonly owned U.S. patent application Ser. No. 09/444,778 to Bourdev et al. entitled "Processing Illustration Artwork," which is hereby incorporated by reference. The resulting output from the processing operation of each tile is a vector representation of the processed objects in the tile.

In one implementation, the vector representation of the processed content in each file can be sent to an output device as a PostScript™ stream. An exemplary PostScript™ algorithm for doing this can be found in Appendix A. The algorithm includes instructions for snapping the clipping path corresponding to each tile to the pixel grid on the actual output device (435) before the processed content of the tile is output (440). Snapping the clipping path includes reducing the size of the clipping path so that it only includes whole pixels on the output device. Any pixels on the output device that were only partially included in the clipping path are excluded when the clipping path is snapped to the pixel grid on the output device. Since the amount of overlap was selected to be at least one device pixel, all the clipping paths can be snapped to the pixel grid of the output device without risking missing any pixels. As a result, each pixel will be completely included inside at least one clipping path.

Returning now to the selected objects in FIG. 3C, an exemplary output is shown in FIG. 3D when the borders of the overlapping tiles are used as clipping paths. First, the lower clipping path is snapped to the pixel grid of the output device and the objects inside the lower clipping path drawn (the part of the light grey object (110) that is included in the clipping path and the black object (120)). Second, the upper clipping path is snapped to the pixel grid of the output device, partly overlapping the lower clipping path, and the objects inside the lower clipping path are drawn (the part of the light grey object (1 0) that is included in the upper clipping path is drawn followed by the dark grey object (115)). Due to the overscan rules in Postscript™, the dark grey object will cover the whole clipping path, and the resulting output of the processed region is shown in FIG. 3D. As can be seen from FIG. 3D, the resulting output is identical to the output shown in FIG. 1, and stitching errors of the type shown in FIG. 2 have been avoided.

Processing in accordance with the invention can be used in any context when the PostScript™ output is generated from a transparency aware application as long as some minimum final resolution can be assumed.

By outputting the content of the tiles as vectors, the data will be more device-independent. For example, fonts can be used from the final output device and downstream processing, such as trapping, can operate on vector data, further avoiding rendering mismatches and color conversion mismatches.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular implementations. Other implementations are within the scope of the following claims. For example, the steps of the invention can be performed in a different order and still achieve desirable results. The method can be used even when no transparent objects are present, for example, in order to subdivide a graphics illustration that is to be output on a printer and thereby allow the printer to use less internal memory. Furthermore, if the graphics application program has knowledge about the exact pixel size in the output device space, the tiles can be adjacent and do not need to overlap. The overlap can be avoided because the size and shape of the tiles can be chosen to conform exactly to the pixel boundaries in the output device space.

The processing method described in this application can also be use in combination with conventional raster based tiling processes, where the novel process described in this application and conventional processes can be applied to different regions of a computer graphics illustration.

What is claimed is:

1. A method of processing a computer graphics illustration, the computer graphics illustration having overlapping objects, comprising:
   breaking up, without regard to the overlapping objects, at least a region of the computer graphics illustration into tiles having overlapping boundaries; and
   planarizing the objects in each tile to create flattened vector output representing the tiled region of the computer graphics illustration.

2. The method of claim 1, wherein at least one of the overlapping objects is transparent and planarizing comprises:
   converting the objects in each tile to an opaque flattened vector output representing the tiled region of the computer graphics illustration.

3. The method of claim 1, wherein breaking up at least a region of the computer graphics illustration into tiles having overlapping boundaries comprises:
   breaking up the computer graphics illustration into tiles having overlapping boundaries where a plurality of the tiles have a same shape.

4. The method of claim 1, wherein breaking up at least a region of the computer graphics illustration into tiles having overlapping boundaries comprises:
   breaking up the computer graphics illustration into tiles having overlapping boundaries where a plurality of the tiles have a same size.

5. The method of claim 1, wherein breaking up at least a region of the computer graphics illustration into tiles having overlapping boundaries comprises:
   breaking up the computer graphics illustration into square shaped tiles with overlapping boundaries.

6. The method of claim 1, wherein breaking up at least a region of the computer graphics illustration into tiles having overlapping boundaries comprises:
   breaking up the at least one region of the computer graphics illustration into a grid of adjacent, non-overlapping tiles; and
   expanding the boundaries of one or more tiles in the grid in a direction such that the boundaries of the tiles overlap.

7. The method of claim 6, wherein expanding comprises:
   expanding boundaries of one or more tiles in the grid by at least one pixel in the horizontal direction.

8. The method of claim 1, wherein breaking up at least a region of the computer graphics illustration into tiles having overlapping boundaries comprises:
   breaking up the at least one region of the computer graphics illustration into a grid of adjacent, non-overlapping tiles; and
   expanding the boundaries of one or more tiles in the grid in a vertical direction such that the boundaries of the tiles overlap.

9. The method of claim 8, wherein expanding comprises:
   expanding boundaries of one or more tiles in the grid by at least one pixel in the vertical direction.

10. The method of claim 1, further comprising:
    selecting the size of the tiles based on an available amount of memory for planarizing the tiles.

11. The method of claim 10, further comprising:
    determining if the available amount of memory for planarizing the tiles will be exceeded; and dividing one or more of the overlapping tiles into smaller tiles with overlapping boundaries if the determining step indicates that the available amount of memory for planarizing the tiles will be exceeded.

12. The method of claim 11, wherein the determining step comprises:
predicting if the available amount of memory for planarizing the tiles will be exceeded.

13. The method of claim 11, wherein the determining step comprises:
monitoring if a memory overflow condition occurs during the planarizing of the objects in each tile.

14. The method of claim 11, further comprising:
repeating the dividing step until the size of each tile is such that the available amount of memory for planarizing each tile will not be exceeded.

15. The method of claim 10, further comprising:
selecting the size of the tiles based on a number of objects in a tile.

16. The method of claim 15, further comprising:
determining if the number of objects in the tile exceeds a threshold value; and
dividing one or more of the tiles with overlapping boundaries into smaller tiles with overlapping boundaries if the number of objects in the tile exceeds the threshold value.

17. The method of claim 16, further comprising:
repeating the dividing step until the size of each tile is such that the number of objects in each tile does not exceed the threshold value.

18. The method of claim 1, wherein breaking up at least a region comprises breaking up all of the computer graphics illustration.

19. The method of claim 1, further comprising:
aligning the border of each tile to physical boundaries of pixels in an output device space to make each tile include only pixels of the output device space that are wholly within the tile.

20. A method of processing a computer graphics illustration, the computer graphics illustration having overlapping objects, comprising:
providing, without regard to the overlapping objects, tiles having boundaries that overlap by an amount corresponding to at least one pixel in a device space, the tiles covering at least a region of the computer graphics illustration that includes overlapping objects;
supplying a clipping path corresponding to the boundary of each tile;
processing the objects surrounded by each clipping path to produce a vector output;
defining an alignment tool to be passed as a part of a stream to an output device, the alignment tool being operable to instruct an output device to align each clipping path to physical boundaries of pixels in the output device space to make each tile include only pixels of the output device space that are wholly within the tile; and
providing the tool and the vector output as a stream to the output device.

21. The method of claim 20, wherein the stream to the output device is a Postscript™ stream.

22. The method of claim 20, wherein at least one of the overlapping objects is transparent and processing comprises:
converting the objects in each tile to an opaque flattened vector output representing a tiled region of the computer graphics illustration.

23. The method of claim 20, wherein providing tiles having overlapping boundaries comprises:
providing a plurality of tiles having a same shape.

24. The method of claim 20, wherein providing tiles having overlapping boundaries comprises:
providing a plurality of the tiles having a same size.

25. The method of claim 20, wherein providing tiles having overlapping boundaries comprises:
providing a grid of adjacent, non-overlapping tiles; and
expanding the boundaries of one or more tiles in the grid in a direction such that the boundaries of the tiles overlap.

26. The method of claim 20, wherein providing tiles having overlapping boundaries comprises:
providing a grid of adjacent, non-overlapping tiles; and
expanding the boundaries of one or more tiles in the grid in a horizontal direction such that the boundaries of the tiles overlap.

27. The method of claim 20, wherein providing tiles having overlapping boundaries comprises:
providing a grid of adjacent, non-overlapping tiles; and
expanding the boundaries of one or more tiles in the grid in a vertical direction such that the boundaries of the tiles overlap.

28. The method of claim 20, further comprising:
selecting the size of the tiles based on an available amount of memory for processing the tiles.

29. The method of claim 28, further comprising:
determining if the available amount of memory for processing the tiles will be exceeded; and
dividing one or more of the tiles into smaller tiles with overlapping boundaries if the determining step indicates that the available amount of memory for processing the tiles will be exceeded.

30. The method of claim 29, further comprising:
repeating the dividing step until a size of each tile is such that the available amount of memory for processing each tile will not be exceeded.

31. The method of claim 28, further comprising:
selecting the size of the tiles based on a number of objects in a tile.

32. The method of claim 31, further comprising:
determining if the number of objects in the tile exceeds a threshold value; and
dividing one or more of the tiles with overlapping boundaries into smaller tiles with overlapping boundaries if the number of objects in the tile exceeds the threshold value.

33. The method of claim 32, further comprising:
repeating the dividing step until the size of each tile is such that the number of objects in each tile does not exceed the threshold value.

34. A method of processing a computer graphics illustration, the computer graphics illustration having overlapping objects wherein at least one object is transparent, comprising:
selecting a region of the computer graphics illustration to be processed, the region comprising at least a portion of the transparent object;
creating, without regard to the overlapping objects, a grid of overlapping tiles covering the selected region; and
supplying a clipping path corresponding to the boundary of each tile;
defining an alignment tool to be passed as a part of a stream to an output device, the alignment tool being operable to instruct the output device to align each clipping path to physical boundaries of pixels in an output device space;

for each tile in the tile grid:
processing the objects surrounded by each clipping path to produce a vector output;
passing the vector output and the alignment tool in a stream to the output device;
using the alignment tool to align each tile to physical boundaries of pixels in the output device space to make each tile include only pixels of the output device space that are wholly within the tile; and
rendering the processed objects as vector data on the output device.

35. The method of claim 34, wherein creating a grid of overlapping tiles comprises:
creating a grid of overlapping tiles in which adjacent tiles overlap by at least one pixel.

36. The method of claim 34, wherein at least one of the overlapping objects is transparent and processing comprises:
converting the objects in each tile to an opaque flattened vector output representing the tiled region of the computer graphics illustration.

37. A computer program product for processing a computer graphics illustration, comprising instructions operable to cause a programmable processor to:
break up, without regard to the overlapping objects, at least a region of the computer graphics illustration into tiles having overlapping boundaries; and
planarize the objects in each tile to create flattened vector output representing the titled region of the computer graphics illustration.

38. The computer program product of claim 37, wherein at least one of the overlapping objects is transparent and the instructions to planarize comprise instructions to:
convert the objects in each tile to an opaque flattened vector output representing the titled region of the computer graphics illustration.

39. The computer program product of claim 37, wherein the instructions to break up at least a region of the computer graphics illustration into tiles having overlapping boundaries comprise instructions to:
break up the computer graphics illustration into tiles having overlapping boundaries where a plurality of the tiles have a same shape.

40. The computer program product of claim 37, wherein the instructions to break up at least a region of the computer graphics illustration into tiles having overlapping boundaries comprise instructions to:
break up the computer graphics illustration into tiles having overlapping boundaries where a plurality of the tiles a the same size.

41. The computer program product of claim 37, wherein instructions to break up at least a region of the computer graphics illustration into tiles having overlapping boundaries comprise instructions to:
break up the computer graphics illustration into square shaped tiles with overlapping boundaries.

42. The computer program product of claim 37, wherein the instructions to break up at least a region of the computer graphics illustration into tiles having overlapping boundaries comprise instructions to:
break up the at least one region of the computer graphics illustration into a grid of adjacent, non-overlapping tiles; and
expand the boundaries of one or more tiles in the grid in a direction such that the boundaries of the tiles overlap.

43. The computer program product of claim 42, wherein the instructions to expand comprise instructions to:
expand boundaries of one or more tiles in the grid by at least one pixel in the horizontal direction.

44. The computer program product of claim 37, wherein the instructions to break up at least a region of the computer graphics illustration into tiles having overlapping boundaries comprise instructions to:
break up the at least one region of the computer graphics illustration into a grid of adjacent, non-overlapping tiles; and
expand the boundaries of one or more tiles in the grid in a vertical direction such that the boundaries of the tiles overlap.

45. The computer program product of claim 44, wherein the instructions to expand comprise instructions to:
expand boundaries of one or more tiles in the grid by at least one pixel in the vertical direction.

46. The computer program product of claim 37, further comprising instructions to:
select the size of the tiles based on an available amount of memory for planarizing the tiles.

47. The computer program product of claim 46, further comprising instructions to:
determine if the available amount of memory for planarizing the tiles will be exceeded; and
divide one or more of the overlapping tiles into smaller tiles with overlapping boundaries if the determination indicates that the available amount of memory for planarizing the tiles will be exceeded.

48. The computer program product of claim 47, where in the instructions to determine comprise instructions to:
predict if the available amount of memory for planarizing the tiles will be exceeded.

49. The computer program product of claim 47, wherein the instructions to determine comprise instructions to:
monitor if a memory overflow condition occurs during the planarizing of the objects in each tile.

50. The computer program product of claim 47, further comprising instructions to:
repeat the dividing step until the size of each tile is such that the available amount of memory for planarizing each tile will not be exceeded.

51. The computer program product of claim 46, further comprising instructions to:
select the size of the tiles based on the number of objects in a tile.

52. The computer program product of claim 51, further comprising instructions to:
determine if the number of objects in the tile exceeds a threshold value; and
divide one or more of the tiles with overlapping boundaries into smaller tiles with overlapping boundaries if the number of objects in the tile exceeds the threshold value.

53. The computer program product of claim 52, further comprising instructions to:
repeat the dividing step until the size of each tile is such that the number of objects in each tile does not exceed the threshold value.

54. The computer program product of claim 37, wherein the instructions to break up at least a region comprise instructions to break up all of the computer graphics illustration.

55. The computer program product of claim 37, further comprising instructions to:
align the border of each tile to physical boundaries of pixels in an output device space to make each tile include only pixels of the output device space that are wholly within the tile.

56. A computer program product for processing a computer graphics illustration, comprising instructions operable to cause a programmable processor to:
provide, without regard to the overlapping objects, tiles having boundaries that overlap by an amount corresponding to at least one pixel in a device space, the tiles covering at least a region of the computer graphics illustration that includes overlapping objects;
supply a clipping path corresponding to the boundary of each tile;
process the objects surrounded by each clipping path to produce a vector output;
define an alignment tool to be passed as a part of a stream to an output device, the alignment tool being operable to instruct the output device to align each clipping path to physical boundaries of pixels in the output device space to make each tile include only pixels of the output device space that are wholly within the tile; and
provide the tool and the vector output as a stream to the output device.

57. The computer program product of claim 56, wherein the stream to the output device is a Postscript™ stream.

58. The computer program product of claim 56, wherein at least one of the overlapping objects is transparent and the instructions to process comprises instructions to:
convert the objects in each tile to an opaque flattened vector output representing a tiled region of the computer graphics illustration.

59. The computer program product of claim 56, wherein the instructions to provide tiles having overlapping boundaries comprises instructions to:
provide a plurality of the tiles having a same shape.

60. The computer program product of claim 56, wherein the instructions to provide tiles having overlapping boundaries comprises instructions to:
provide a plurality of the tiles having a same size.

61. The computer program product of claim 56, wherein the instructions to provide tiles having overlapping boundaries comprises instructions to:
provide a grid of adjacent, non-overlapping tiles; and
expand the boundaries of one or more tiles in the grid in a direction such that the boundaries of the tiles overlap.

62. The computer program product of claim 56, wherein the instructions to provide tiles having overlapping boundaries comprises instructions to:
provide a grid of adjacent, non-overlapping tiles; and
expand the boundaries of one or more tiles in the grid in a horizontal direction such that the boundaries of the tiles overlap.

63. The computer program product of claim 56, wherein the instructions to provide tiles having overlapping boundaries comprises instructions to:
provide a grid of adjacent, non-overlapping tiles; and
expand the boundaries of one or more tiles in the grid in a vertical direction such that the boundaries of the tiles overlap.

64. The computer program product of claim 56, further comprising instructions to:
select the size of the tiles based on an available amount of memory for processing the tiles.

65. The computer program product of claim 64, further comprising instructions to:
determine if the available amount of memory for processing the tiles will be exceeded; and
divide one or more of the tiles into smaller tiles with overlapping boundaries if the determination indicates that the available amount of memory for processing the tiles will be exceeded.

66. The computer program product of claim 65, further comprising instructions to:
repeat the dividing step until a size of each tile is such that the available amount of memory for processing each file will not be exceeded.

67. The computer program product of claim 64, further comprising instructions to:
select the size of the tiles based on a number of objects in a tile.

68. The computer program product of claim 67, further comprising instructions to:
determine if the number of objects in the tile exceeds a threshold value; and
divide one or more of the tiles with overlapping boundaries into smaller tiles with overlapping boundaries if the number of objects in the tile exceeds the threshold value.

69. The computer program product of claim 68, further comprising instructions to:
repeat the dividing step until the size of each tile is such that the number of objects in each tile does not exceed the threshold value.

70. A computer program product for processing a computer graphics illustration, comprising instructions operable to cause a programmable processor to:
select a region of the computer graphics illustration to be processed, the region comprising at least a portion of the transparent object;
create, without regard to the overlapping objects, a grid of overlapping tiles covering the selected region; and
supply a clipping path corresponding to the boundary of each tile;
define an alignment tool to be passed as a part of a stream to an output device, the alignment tool being operable to instruct the output device to align each clipping path to physical boundaries of pixels in an output device space;
for each tile in the tile grid:
process the objects surrounded by each clipping path to produce a vector output;
pass the vector output and the alignment tool in a stream to the output device;
use the alignment tool to align each tile to physical boundaries of pixels in the output device space to make each tile include only pixels of the output device space that are wholly within the tile; and
render the processed objects as vector data on the output device.

71. The computer program product of claim 70, wherein the instructions to create a grid of overlapping tiles comprises instructions to:
create a grid of overlapping tiles in which adjacent tiles overlap by at least one pixel.

72. The computer program product of claim 70, wherein at least one of the overlapping objects is transparent and the instructions to process comprises instructions to:
convert the objects in each tile to an opaque flattened vector output representing the tiled region of the computer graphics illustration.

* * * * *